United States Patent
Grayson (10) Patent No.: US 11,761,564 B2
(45) Date of Patent: Sep. 19, 2023

(54) FLEXIBLE DRAIN PIPE

(71) Applicant: Crushproof Tubing Company, McComb, OH (US)

(72) Inventor: J. Todd Grayson, McComb, OH (US)

(73) Assignee: CRUSHPROOF TUBING COMPANY, McComb, OH (US)

( * ) Notice: Subject to any disclaimer, the term of this patent is extended or adjusted under 35 U.S.C. 154(b) by 701 days.

(21) Appl. No.: 16/600,678

(22) Filed: Oct. 14, 2019

(65) Prior Publication Data

US 2020/0116281 A1 Apr. 16, 2020

Related U.S. Application Data

(60) Provisional application No. 62/744,930, filed on Oct. 12, 2018.

(51) Int. Cl.
*F16L 11/15* (2006.01)
*E03C 1/284* (2006.01)

(52) U.S. Cl.
CPC .............. *F16L 11/15* (2013.01); *E03C 1/284* (2013.01)

(58) Field of Classification Search
CPC ................................. E03C 1/284; F16L 11/15
USPC ............................................................ 4/679
See application file for complete search history.

(56) References Cited

U.S. PATENT DOCUMENTS

| X987807 | 3/1911 | Lonskey |
| 1,156,145 A | 10/1915 | Jenkins |
| 2,969,830 A | 1/1961 | Thompson |
| 3,313,314 A | 4/1967 | Burke et al. |
| 3,495,629 A | 2/1970 | Botsolas et al. |
| 3,860,978 A * | 1/1975 | Wirth ...................... E03C 1/284 4/DIG. 16 |
| 4,081,190 A * | 3/1978 | Itzler ....................... F16L 27/11 285/423 |
| 4,151,864 A | 5/1979 | Thurman |
| 4,516,478 A * | 5/1985 | Connelly ................. B66D 3/06 254/386 |
| 4,862,528 A | 9/1989 | Clarke et al. |
| 4,922,554 A * | 5/1990 | Hwang ................... E03C 1/284 4/DIG. 16 |
| 5,363,517 A | 11/1994 | Botsolas |

(Continued)

FOREIGN PATENT DOCUMENTS

| CN | 4134069 C1 | 2/1993 |
| CN | 2605324 Y | 3/2004 |

(Continued)

*Primary Examiner* — Christine J Skubinna
(74) *Attorney, Agent, or Firm* — Michael E. Dockins; Shumaker, Loop & Kendrick LLP (57) ABSTRACT

Drain pipe assemblies are provide that include a first flexible pipe having a first end, a second end, and a plurality of convolutions formed therein. A first female threaded connector is is provided that is configured to receive one of the convolutions of the first flexible pipe therein. In this way, the first female threaded connector can form a seal when the one of the convolutions received therein is proximate the first end of the first flexible pipe and the first female threaded connector is threadably coupled to a first male threaded coupling. A retainer is provided that is configured to dispose a portion of the flexible pipe therethrough to form and retain a trap in the first flexible pipe. Methods of installing and using such drain pipe assemblies are also provided.

20 Claims, 7 Drawing Sheets

(56) References Cited

U.S. PATENT DOCUMENTS

| | | | |
|---|---|---|---|
| 6,102,445 A * | 8/2000 | Thomas | F16L 25/0036 |
| | | | 285/353 |
| 6,311,936 B1 | 11/2001 | Hierr et al. | |
| 7,941,878 B1 * | 5/2011 | Truong | E03C 1/122 |
| | | | 4/689 |
| 8,621,683 B2 | 1/2014 | Coronado et al. | |
| 2003/0042736 A1 | 3/2003 | Vila | |
| 2005/0178438 A1 * | 8/2005 | Renner | E03C 1/122 |
| | | | 137/247.41 |
| 2006/0026860 A1 * | 2/2006 | Blann | E03C 1/184 |
| | | | 34/140 |
| 2010/0024120 A1 * | 2/2010 | Coronado | F16L 43/008 |
| | | | 4/679 |
| 2015/0136267 A1 * | 5/2015 | Yu | E03C 1/284 |
| | | | 138/109 |

FOREIGN PATENT DOCUMENTS

| | | |
|---|---|---|
| CN | 202492896 U | 10/2012 |
| DE | 2756243 A1 | 7/1979 |
| FR | 2653202 A1 | 4/1991 |
| GB | 2241986 A | 9/1991 |
| KR | 100764946 B1 | 10/2007 |

\* cited by examiner

FLEXIBLE DRAIN PIPE

CROSS-REFERENCE TO RELATED APPLICATIONS

This application claims the benefit of U.S. Provisional Application No. 62/744,930, filed on Oct. 12, 2018 and U.S. Provisional Application No. 62/860,848, filed on Jun. 13, 2019. The entire disclosures of the above applications are incorporated herein by reference.

FIELD

The present technology relates to a flexible drain pipe assembly, including a flexible drain pipe assembly employing a shape retaining means to form and retain a trap in a flexible pipe.

INTRODUCTION

This section provides background information related to the present disclosure which is not necessarily prior art.

In plumbing, a trap is a device which has a shape that uses a bending path to capture water and prevent sewer gases from entering buildings, while allowing waste to pass through. Domestic applications include traps that can have a U, S, Q, or J-shaped pipe located below or within a plumbing fixture. An S-shaped trap is also known as an S-bend. Another common trap includes a P-trap, which includes the addition of a 90 degree fitting on the outlet side of a U-bend, thereby creating a P-like shape. The P-trap is generally referred to as a sink trap as it is installed under most domestic sinks.

Based upon the shape and size of the trap, the trap retains an amount of liquid to occlude a portion of the drain pipe after a volume of liquid is discharged or passed therethrough. This retained liquid in the trap creates a seal that prevents gas, such as sewer gas, from passing through the drain pipe back into an occupied space of a building, for example. Essentially all plumbing fixtures, including sinks, bathtubs, and toilets, are equipped with either an internal or external trap to provide a liquid seal and prevent backflow of such gases.

Because it is a localized low-point in the plumbing, sink traps also tend to capture heavy objects (e.g., jewelry) that are inadvertently dropped into the sink or that pass through the drain pipe. Traps also tend to collect other debris, such as hair, sand, and certain water insoluble materials (e.g., fat and grease), and can limit the ultimate size of objects that may pass on into the remainder of the plumbing system, thereby catching and collecting oversized objects and preventing such objects from passing further downstream in the plumbing system. For these various reasons, it is desirable to provide a trap that can be readily accessed, where the trap can either be disassembled for cleaning or that provides some sort of replacement or clean-out feature to permit removal of any objects within the trap. It is also desirable to provide an original or replacement trap assembly that can be deployed in spaces having various dimensions to accommodate various fixtures, locales, and architectures, which can also be used to repair or replace broken or clogged traps and/or other sections of a plumbing system.

SUMMARY

The present technology includes articles of manufacture, systems, and processes that relate to a drain pipe assembly.

Drain pipe assemblies are provided that include a first flexible pipe, a first female threaded connector, and a retainer. The first flexible pipe has a first end, a second end, and a plurality of convolutions formed therein. The first female threaded connector is configured to receive one of the convolutions of the first flexible pipe therein. The first female threaded connector is further configured to form a seal when the one of the convolutions received therein is proximate the first end of the first flexible pipe and the first female threaded connector is threadably coupled to a first male threaded coupling. The retainer is configured to dispose a portion of the flexible pipe therethrough to form and retain a trap in the first flexible pipe. For example, the retainer can be configured to form a substantially U-shaped bend in the portion of the flexible pipe disposed therethrough.

Methods of installing and using such drain pipe assemblies are provided that include disposing one of the convolutions proximate the first end of the first flexible pipe within the first female threaded connector and coupling the first female threaded connector to the first male threaded coupling of a waste line to form the seal. The second end of the first flexible pipe is coupled to a sink basin. And a portion of the flexible pipe is disposed through the retainer to form and retain the trap in the first flexible pipe.

Further embodiments of drain pipe assemblies are provided that include a plurality of flexible pipes, a plurality of female threaded connectors, a multi junction connector, and a retainer. Each of the flexible pipes includes a plurality of convolutions. Each of the female threaded connectors is configured to receive one of the convolutions of one of the flexible pipes therein, where each of the female threaded connectors configured to form a seal when the one of the convolutions received therein is proximate an end of one of the flexible pipes and the female threaded connector is threadably coupled to a male threaded coupling. The multi junction connector includes a plurality of male threaded couplings. The retainer is configured to dispose a portion of one of the flexible pipes therethrough to form and retain a trap in the one of the flexible pipes.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology provides drain pipe assemblies that include a flexible pipe and a retainer configured to dispose a portion of the flexible pipe therethrough to form and retain a trap in the first flexible pipe. The trap can be provided by forming a substantially U-shaped bend in the flexible pipe that prevents gas flow through the pipe when a liquid is contained therein. The respective ends of the flexible pipe can be coupled to a fixture and a waste line or drain pipe to provide a trap that can be readily accessed, where the trap can either be disassembled for cleaning or that can be readily replaced, completely disassembled, or partially disassembled to permit removal of any objects caught within the trap. The drain pipe assembly can be used as an original trap assembly for a fixture or used as replacement trap assembly. Advantageously, the flexible pipe and the retainer can be deployed in spaces having various dimensions to accommodate various fixtures, locales, and architectures, allowing repair or replacement of broken or clogged traps and/or other sections of a plumbing system. The drain pipe assembly can be self-plunging, provided in standard or universal lengths for various fixtures, provide fewer joints and/or leak points than other drain pipe assemblies, and can be configured with rubber-on-rigid connections to provide improved couplings and substantially water-tight fittings compared to plastic-on-metal or plastic-on-plastic connections.

In certain embodiments, a drain pipe assembly can include a first flexible pipe, a first female threaded connector, and a retainer. The first flexible pipe has a first end, a second end, and a plurality of convolutions formed therein. The first female threaded connector is configured to receive one of the convolutions of the first flexible pipe therein. In this way, the first female threaded connector is configured to form a seal when the convolution received therein is proximate the first end of the first flexible pipe and the first female threaded connector is threadably coupled to a first male threaded coupling. Engagement of the first female threaded connector and the first male threaded coupling can compress the convolution therebetween and form a substantially liquid-tight seal. The first male threaded coupling can be an end of a pipe of a plumbing system, such as a waste line, for example. The retainer is configured to dispose a portion of the flexible pipe therethrough to form and retain a trap in the first flexible pipe.

Flexible pipes, as described herein, including the first flexible pipe, can include the following aspects. The plurality of convolutions can be formed by alternating ribs and valleys. For example, the ribs can provide a greater cross-sectional diameter than the valleys. The convolutions may also be referred to a corrugations or accordion-like pleats. The flexible pipe can be formed of an elastomeric material, including natural and/or synthetic rubber materials and composite materials. The flexible pipe can include one or more reinforcement materials as well as various antimicrobial materials to minimize biofilm formation thereon. For example, the portion of the flexible pipe disposed through the retainer to form and retain the trap in the first flexible pipe can be in substantially constant contact with liquid. The presence of one or more antimicrobial materials within and/or coating the flexible pipe can minimize biofilm and sludge accumulation. One or more flexible pipes can be cut at one or more predetermined or desired locations to change the nature of the first end and/or second end thereof and which of the convolutions of the flexible pipe defines the first end and/or the second end thereof. Cutting of a flexible pipe can be done in a valley between two ribs of the convolutions. In this way, a complete convolution (e.g, from valley low point to rib high point and back down to another valley low point) can be received within the female threaded connector. A flange of the female connector can be positioned behind the received convolution (e.g., within the another valley low point). In this way, the received convolution can thereby be pressed between the flange of the female connector and the male threaded coupling to form a seal when the female threaded connector is threadably coupled to the male threaded coupling. The flexible nature of the flexible pipe material can compress and form a substantially fluid-tight seal.

In addition to the first female threaded connector, the drain pipe assembly can include a clamp configured to fit around the second end of the first flexible pipe. The clamp can be operable to compress and couple the second end of the first flexible pipe to a pipe received therein. For example, the second end of the first flexible pipe can be slid or installed over a tailpipe of a sink basin, where the clamp can be configured similar to a hose clamp to compress the second end of the first flexible pipe around the tailpipe to provide a substantially fluid-tight seal. The clamp can take the form of a hose clamp with a key or wingnut type tightening mechanism that can be operated by hand without the need for a screwdriver, socket, or other such tool.

The retainer can include the following aspects. In certain embodiments, the retainer can be configured as a continuous loop. That is, the retainer can be a continuous loop sized to fit at least two cross-sections of the flexible pipe through an opening of the continuous loop. A portion of the flexible pipe between the first end and the second end can therefore be fit through the opening of the continuous loop and form a curved structure that enters and exits the opening of the continuous loop. For example, the continuous loop can take the form of an oval or racetrack. In certain embodiments, the retainer can be configured as a discontinuous loop. The discontinuous loop can be a discontinuous loop sized to fit at least two cross-sections of the flexible pipe through an opening of the loop, but the flexible pipe can be fit through a break of the discontinuous loop in addition to being fit through the opening of the discontinuous loop. For example, the discontinuous loop can take the form of an oval or racetrack with a break therein, where the break can be spaced to allow a cross-section of the flexible pipe to fit through. The presence of the break can make the discontinuous loop take a C-shaped form or a form having two hook-shaped portions, where each hook-shaped portion is sized to accommodate a cross-section of the flexible pipe. Each hook-shaped portion can also include tabs or protrusions in order to engage different cross-sectional diameters of the flexible pipe.

Whether continuous or discontinuous, the loop can have a thickness sized to fit between convolutions of the flexible pipe. In particular, the loop can have a thickness sized to nest within a valley between two ribs of the convolutions. In this way, the retainer in the form of a loop can engage the portion of the flexible pipe disposed therethrough to form and retain the trap in the first flexible pipe. This engagement prevents the loop and flexible pipe from moving or slipping relative to each other. It also provides for easy adjustment of the loop relative to the flexible pipe for increasing or decreasing the portion of the flexible pipe disposed through the loop. For example, the retainer can be configured to form a substantially U-shaped bend in the portion of the flexible pipe disposed therethrough. The size of the U-shaped bend, namely the lengths of the arms of the U leading to the bottom connecting curve, can be adjusted by moving/advancing the engagement of the loop with the flexible pipe one or more convolutions in a particular direction. Each arm of the U can be adjusted in this manner, allowing optimization of the position of the drain pipe assembly, the trap location, the trap size, and/or the trap configuration in the portion of the flexible pipe disposed through the loop. In certain embodiments, for example, the retainer can include a trap distance guide defining a predetermined length of the portion of the flexible pipe to be disposed through the retainer to form and retain the trap in the flexible pipe. The trap distance guide can extend from a remainder of the retainer a predetermined distance to establish an optimal or preferred trap size based upon the diameter of the flexible pipe and/or for a particular application. For example, where the retainer is a loop, the loop can have an extension depending therefrom in a perpendicular direction to set an inside distance of a U-shaped bend in the portion of the flexible pipe disposed through the loop.

In certain embodiments, the drain pipe assembly can include a second female threaded connector configured to receive another one of the convolutions of the first flexible pipe therein. In this way, the second female threaded connector can be configured to form a seal when the another one of the convolutions received therein is proximate the second end of the first flexible pipe and the second female threaded connector is threadably coupled to a second male threaded coupling. Engagement of the second female threaded connector and the second male threaded coupling can compress the convolution therebetween and form a substantially liquid-tight seal. The second male threaded coupling can be an end of a pipe of a plumbing system, such as a waste line, for example, another portion of a plumbing system. The second male threaded coupling can also be part of a multi junction connector, such as a three-way connector, used to fluidly couple various portions of a plumbing system and/or various fixtures or devices installed within the plumbing system.

In certain embodiments, the drain pipe assembly can include a three-way connector. The three-way connector can include the the second male threaded coupling, as noted herein. The three-way connector can be substantially Y-shaped and the second male threaded coupling can be positioned on the bottom of the Y, facing substantially opposite the two remaining coupling points of the three-way connector. The three-way connector can also be configured to include an aperture having a plug, where the aperture can be configured to receive a dishwasher drain line when the plug is removed. The plug can be reversibly coupled to the aperture (e.g., a threaded plug) or the plug can be a knock-out plug that is removed to reveal the aperture.

In certain embodiments, the drain pipe assembly can include a second flexible pipe and a third female threaded connector. The second flexible pipe can include a first end, a second end, and a plurality of convolutions formed therein. The third female threaded connector can be configured to receive one of the convolutions of the second flexible pipe therein. In this way, the third female threaded connector can be configured to form a seal when the one of the convolutions of the second flexible pipe received therein is proximate the first end of the second flexible pipe and the third female threaded connector is threadably coupled to a third male threaded coupling of the three-way connector. A fourth female threaded connector can also be included, where the fourth female threaded connector can be configured to receive another one of the convolutions of the second flexible pipe therein. In this way, the fourth female threaded connector can be configured to form a seal when the another one of the convolutions of the second flexible pipe received therein is proximate the second end of the second flexible pipe and the fourth female threaded connector is threadably coupled to a fourth male threaded coupling. For example, the fourth female threaded connector can be configured to be threadably coupled to the fourth male threaded coupling of a sink basin.

In certain embodiments, the drain pipe assembly can include a third flexible pipe and a fifth female threaded connector. The third flexible pipe can include a first end, a second end, and a plurality of convolutions formed therein. The fifth female threaded connector can be configured to receive one of the convolutions of the third flexible pipe therein. In this way, the fifth female threaded connector can be configured to form a seal when the one of the convolutions of the third flexible pipe received therein is proximate the first end of the third flexible pipe and the fifth female threaded connector is threadably coupled to a fifth male threaded coupling of the three-way connector. A sixth female threaded connector can also be included, where the sixth female threaded connector can be configured to receive another one of the convolutions of the third flexible pipe therein. In this way, the sixth female threaded connector can be configured to form a seal when the another one of the convolutions of the third flexible pipe received therein is proximate the second end of the third flexible pipe and the sixth female threaded connector is threadably coupled to a sixth male threaded coupling. For example, the sixth female threaded connector can be configured to be threadably coupled to the sixth male threaded coupling of another sink basin.

Drain pipe assemblies of the present technology can be configured for installation in various ways using various standardized plumbing connections and dimensions, for example. Embodiments include where the first female threaded connector is configured to be threadably coupled to the first male threaded coupling of a waste line, the fourth female threaded connector is configured to be threadably coupled to the fourth male threaded coupling of a sink basin, and/or the sixth female threaded connector is configured to be threadably coupled to the sixth male threaded coupling of another sink basin.

Drain pipe assemblies can also include one or more clips configured to pinch the first flexible pipe to substantially block passage of fluid therethrough. The clip can be used to compress or pinch off a location of the flexible pipe. One or more clips can be used to isolate the trap formed by the drain pipe assembly to minimize spillage during removal or maintenance thereof. Similarly, one or more clips can be used to pinch off the flexible pipe so that a cleaner (e.g., soap, bleach, etc.) can be added to the assembly, allowed to sit for a period of time to clean/sterilize the portion of the flexible pipe forming the trap and/or other portions of the flexible pipe or other flexible pipes. The clip(s) can then be removed to restore flow and wash away the cleaner and any debris.

In certain embodiments, the drain pipe assembly can include a plurality of flexible pipes, a plurality of female threaded connectors, a multi junction connector, and a retainer. Each of the flexible pipes can include a plurality of convolutions. Each of the female threaded connectors can be configured to receive one of the convolutions of one of the flexible pipes therein, where each of the female threaded connectors is configured to form a seal when the one of the convolutions received therein is proximate an end of one of the flexible pipes and the female threaded connector is threadably coupled to a male threaded coupling. The multi-junction connector can include a plurality of male threaded couplings. The retainer can be configured to dispose a portion of one of the flexible pipes therethrough to form and retain a trap in the one of the flexible pipes.

Various methods of installing a drain pipe assembly are provided that can employ the various drain pipe assemblies described herein. Such methods can include disposing one of the convolutions proximate the first end of the first flexible pipe within the first female threaded connector and coupling the first female threaded connector to the first male threaded coupling of a waste line to form the seal. The second end of the first flexible pipe can be coupled to a sink basin. And a portion of the flexible pipe can be disposed through the retainer to form and retain the trap in the first flexible pipe.

In certain embodiments, the flexible pipe has a first end configured for coupling to an upstream plumbing location, such as a sink basin, and a second end configured for coupling to a downstream plumbing location, such as a drain. By flexible, it is meant that the flexible pipe is capable of bending without breaking or resulting in a substantial loss of structural integrity and where the pipe remains a substantially continuous conduit without a kink or pinch point forming that occludes passage of a liquid therethrough. In particular, the flexible pipe must be flexible enough to allow the pipe to form at least one U-shaped bend therein. For example, the flexible pipe can include one or more bends, including U-shaped bends, along its length. Such bends can result in portions of the flexible pipe being substantially parallel, where the substantially parallel lengths are connected by a curve therebetween. By a substantially U-shaped bend, it is meant that the flexible pipe can be bent so that a flow though the flexible pipe turns to flow in a generally opposite direction. For example, the flow of a liquid through the pipe can be generally antiparallel along lengths of the flexible pipe connected by the U-shaped bend. In certain embodiments, the flexible pipe can be a convoluted pipe. The convoluted pipe can have one or more corrugations or an accordion-like configuration allowing segments or pleats to expand and/or bend to provide a series of angle changes in bending the flexible pipe. The accordion segments of the flexible pipe can be configured to generally retain their shape once a bend is made or can remain pliable. The flexible nature can vary from where a tool is necessary to bend the flexible pipe to where the flexible pipe can be hand bent or where gravity is capable of inducing a bend in the flexible pipe. Flexible pipes can include one or two dual sized flexible ends that allow for universal fit over 1.25" or 1.5" tailpipes or other plumbing components.

Where the retainer is configured as a loop, the loop can have a single aperture that is configured to dispose a portion of the flexible pipe therethrough to form a substantially U-shaped bend therein. The loop can be configured as an oval shape or loop where two elongated ends can contact and hold the flexible pipe at two points. A portion of the flexible pipe can be inserted through the loop so that the loop maintains a substantially U-shaped bend in the flexible pipe. The loop can be formed of a stiff material or can have some elasticity allowing the loop to stretch and contract to provide tension in response to the portion of the flexible pipe disposed therethrough. For example, forming the substantially U-shaped bend in the flexible pipe may result in the pipe pushing back against the two elongated ends of the oval. Where the flexible pipe is a convoluted pipe, the loop can be configured to fit within or interact with the convolutions to prevent the flexible pipe and the loop from moving relative to each other. The loop can be a continuous, unbroken band or ring, or the loop can be discontinuous, with a break therein, the ends at the break approaching each other or directed toward each other. When the loop is continuous, the flexible pipe is disposed through the aperture to form the substantially U-shaped bend. When the loop is discontinuous, the loop can include a structure having two J-shaped hooks at either end, where each J-shaped hook is configured to hold a portion of the flexible pipe and together form the substantially U-shaped bend.

The retainer can be configured as a sleeve, where the sleeve can be rigid and have at least a partially U-shaped form. The sleeve can be configured to fit over a portion of the flexible pipe and at least initiate or provide the substantially U-shaped bend therein. The flexible pipe can be passed through the sleeve where the sleeve causes the flexible pipe to flex and conform to a U-shaped bend induced by the sleeve. The sleeve itself can be rigid and generally U-shaped and can prevent the portion of the flexible pipe contained therein from bending or adopting any other configuration, thereby maintaining the U-shaped bend following further manipulation, impact, or pressure that is applied to the flexible pipe. In this way, the rigid sleeve preserves the substantially U-shaped bend in the portion of the flexible pipe. The flexible pipe can be slid through the sleeve due to its flexible nature to adjust the location where the rigid sleeve fits over a portion of the flexible pipe and provides the substantially U-shaped bend therein. For example, the sleeve can be positioned over any portion of the flexible pipe between the first end and the second end. The sleeve can be rigid, in that the rigid sleeve cannot substantially bend without breaking or resulting in a substantial loss of structural integrity. In particular, the rigid sleeve is more resistant to deformation than the flexible pipe. The rigid sleeve can be a continuous sleeve about a portion of the flexible pipe or the sleeve can have one or more cutouts therein. In certain embodiments, the sleeve can be configured as a framework or lattice that conforms a portion of the flexible pipe to a substantially U-shaped bend.

A portion of the U-shaped bend of the flexible pipe can be configured or positioned to retain an amount of liquid that flows through the drain pipe assembly. For example, the U-shaped bend can be positioned such that a low spot is present in a portion thereof, where gravity serves to retain the amount of liquid flowing through the drain pipe assembly. The amount of liquid is able to occlude a cross-section of the flexible pipe to prevent gas from passing therethrough, effectively forming a trap. That is, the substantially U-shaped bend can have the outside of the bend pointed in a generally downward direction or straight down to allow gravity to hold an amount of liquid in the substantially U-shaped bend. The amount of flexible pipe used to form the substantially U-shaped bend can be adjusted in relation to the amount of liquid that is to be retained in the substantially U-shaped bend and function as a trap. The substantially U-shaped bend in the flexible pipe can also be just one of multiple bends formed in the flexible pipe. For example, the substantially U-shaped bend can be part of an S-shaped trap having an S-bend or part of a P-shaped trap. Drain pipe assemblies according to the present technology accordingly can have a movable or adjustable trap location due to the flexible pipe design in how the flexible pipe can interact with the retainer; e.g., a continuous loop, discontinuous loop, or sleeve design.

The flexible drain pipe assembly can be readily installed, disassembled, repaired, or replaced. Ends of the flexible pipe can be compatible with standard plumbing components, where the ends of the flexible pipe can be coupled with various fixtures, drains, and/or other pipes and designed to mate with standardized and customized fixtures, drains, and/or other pipes. Threaded fittings can be used in conjunction with the first end and the second end of the flexible pipe to allow the drain assembly to retrofit an existing trap location or to be used with standard commercial plumbing in an original installation.

The drain pipe assembly can be self-plunging, provided in standard or universal lengths for various fixtures, provide fewer joints and/or leak points, and can be configured with rubber-on-rigid connections to provide improved couplings and substantially watertight fittings compared to plastic-on-metal or plastic-on-plastic connections. The self-plunging aspect of the drain pipe assembly includes using the convolutions of the flexible pipe as a means to displace water by expanding and contracting the total volume of the flexible pipe causing and releasing a strong suction effect. Flexible nature of the pipe(s) allows for easy clamp/crimp/closure for drain sterilization. This can be beneficial in settings where spread of harmful pathogens can occur through updraft from a trap. This can be done with a clip (e.g., a spring clip similar to chip bag clip, or a U-shaped piece of plastic). The clip can be used to pinch off flow near the drain end (post trap) followed by pouring a dilute bleach solution into the sink until it fills at least a portion of the drain pipe assembly. After a brief soak, the drain is sterilized and the clip can be removed. This cannot be easily done with a traditional system.

EXAMPLES

Example embodiments of the present technology are provided with reference to the several figures enclosed herewith, where FIGS. 1-7 depict various embodiments of drain pipe assemblies and associated components.

Figure 1:
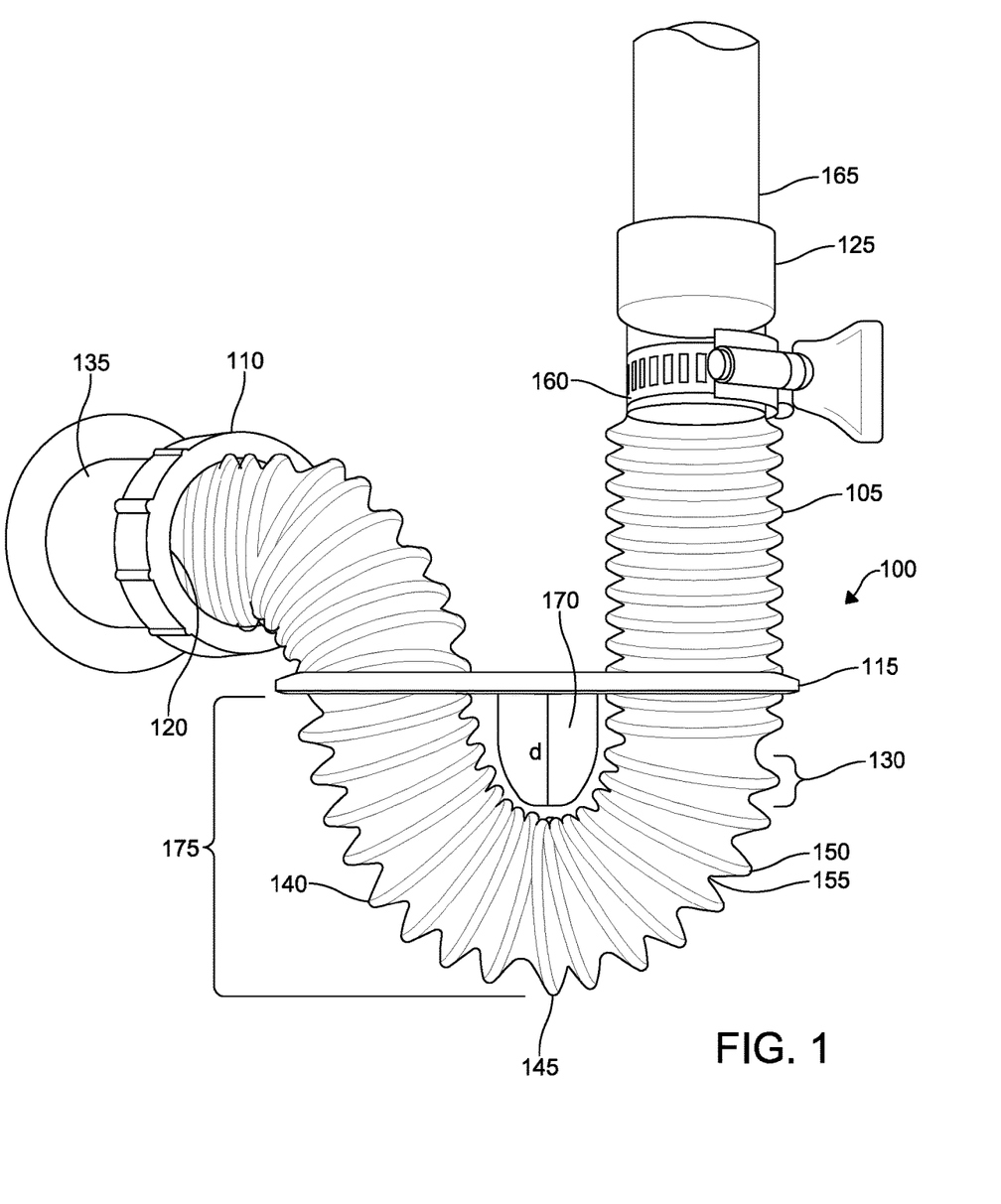
FIG. 1 is a schematic view of an embodiment of a drain pipe assembly installed on a sink tailpipe and waste line using a retainer configured as a loop.

Turning to FIG. 1, an embodiment of a drain pipe assembly is shown at 100 that includes a first flexible pipe 105, a first female threaded connector 110, and a retainer 115. The first flexible pipe 105 has a first end 120, a second end 125, and a plurality of convolutions formed therein, where a single convolution is denoted by 130. The first female threaded connector 110 is configured to receive one of the convolutions 130 of the first flexible pipe 105 therein. In this way, the first female threaded connector 110 is configured to form a seal when the one of the convolutions 130 received therein is proximate the first end 120 of the first flexible pipe 105 and the first female threaded connector 110 is threadably coupled to a first male threaded coupling 135. In the embodiment shown, the first male coupling 135 is part of a drain line. The retainer 115 is configured to dispose a portion 140 of the flexible pipe 105 therethrough to form and retain a trap 145 in the first flexible pipe 105. As can be seen, the plurality of convolutions 130 is formed by alternating ribs and valleys, where a single instance of a rib is identified at 150 and a single instance of a valley is identified at 155. The drain pipe assembly 100 shown also includes a clamp 160 configured to fit around the second end 125 of the first flexible pipe 105, where the clamp 160 is operable to compress and couple the second end 125 of the first flexible pipe 105 to a pipe 165 received therein. In the embodiment depicted, the pipe 165 fit into the second end 125 of the first flexible pipe 105 is a tailpipe of a sink basin. The retainer 115 used in the drain pipe assembly 100 is a loop that includes a trap distance guide 170 defining a predetermined length of the portion 140 of the flexible pipe 105 to be disposed through the retainer 115 to form and retain the trap 145 in the flexible pipe 105. The trap distance guide 170 can extend a distance, denoted as distance d in FIG. 1, to define an inside curve distance of the portion 140 of the flexible pipe 105 to be disposed through the retainer 115. In this way, the distance d of the trap distance guide 170 correlates to the predetermined length of the portion 140 of the flexible pipe 105 to be disposed through the retainer 115. The retainer 115 shown is configured to form a substantially U-shaped bend 175 in the portion 140 of the flexible pipe 105 disposed therethrough. It can be seen that the trap distance guide 170 can also be used to define the extent and geometry of the U-shaped bend 175.

Figure 2:
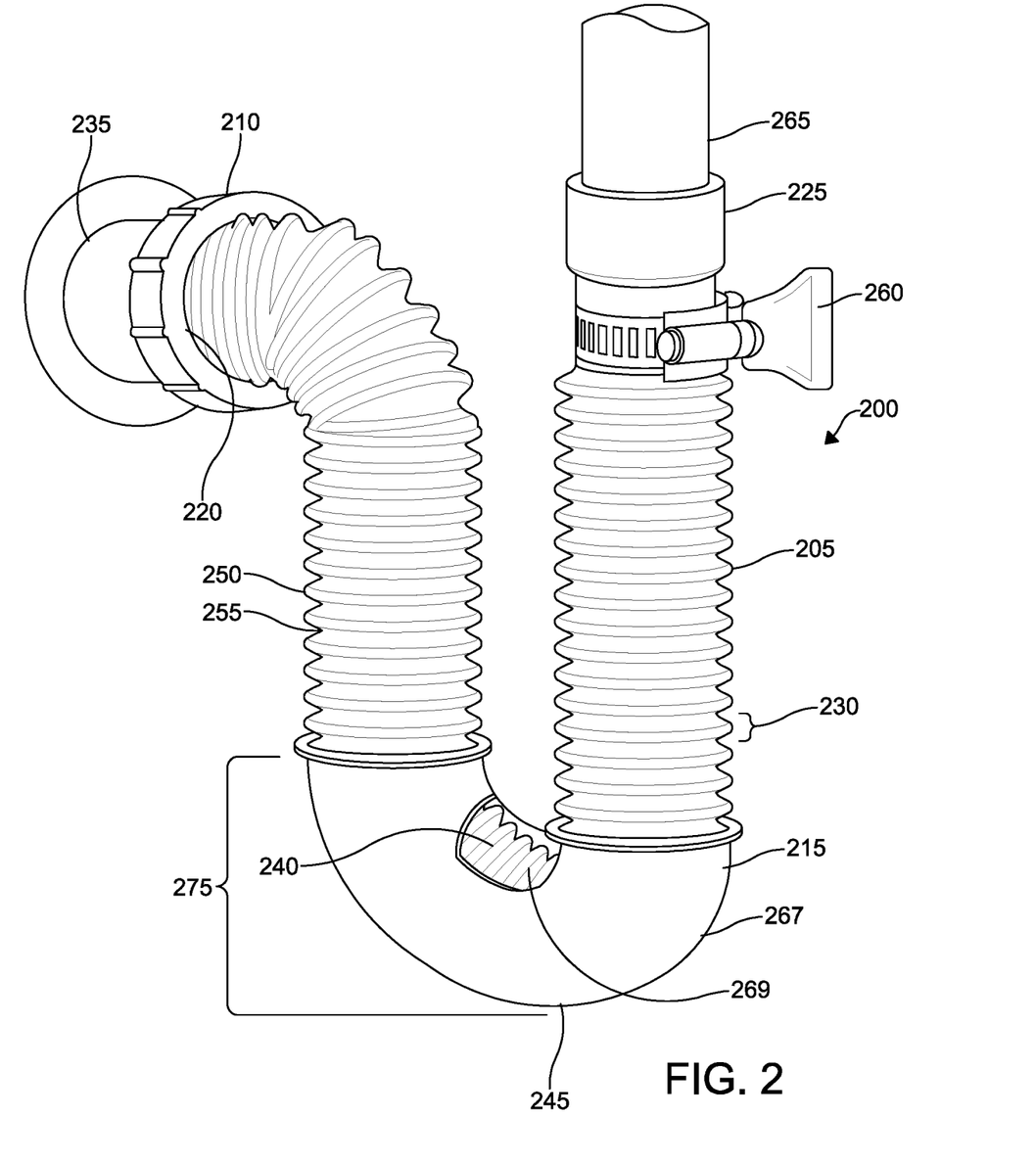
FIG. 2 is a schematic view of an embodiment of a drain pipe assembly installed on a sink tailpipe and waste line using a retainer configured as a sleeve.

Turning to FIG. 2, an embodiment of a drain pipe assembly is shown at 200 that includes a first flexible pipe 205, a first female threaded connector 210, and a retainer 215. The first flexible pipe 205 has a first end 220, a second end 225, and a plurality of convolutions formed therein, where a single convolution is denoted by 230. The first female threaded connector 210 is configured to receive one of the convolutions 230 of the first flexible pipe 205 therein. In this way, the first female threaded connector 210 is configured to form a seal when the one of the convolutions 230 received therein is proximate the first end 220 of the first flexible pipe 205 and the first female threaded connector 210 is threadably coupled to a first male threaded coupling 235. In the embodiment shown, the first male coupling 235 is part of a drain line. The retainer 215 is configured to dispose a portion 240 of the flexible pipe 205 therethrough to form and retain a trap 245 in the first flexible pipe 205. As can be seen, the plurality of convolutions 230 is formed by alternating ribs and valleys, where a single instance of a rib is identified at 250 and a single instance of a valley is identified at 255. The drain pipe assembly 200 shown also includes a clamp 260 configured to fit around the second end 225 of the first flexible pipe 205, where the clamp 260 is operable to compress and couple the second end 225 of the first flexible pipe 205 to a pipe 265 received therein. In the embodiment depicted, the pipe 265 fit into the second end 225 of the first flexible pipe 205 is a tailpipe of a sink basin. The retainer 215 used in the drain pipe assembly 200 is in the form of a sleeve 267 that defines a predetermined length of the portion 240 of the flexible pipe 205 to be disposed through the retainer 215 to form and retain the trap 245 in the flexible pipe 205. The sleeve 267 can include one or more cutouts 269 therein. The retainer 215 in the form of the sleeve 267 can be more rigid than the flexible pipe 205 so that the flexible pipe 205 bends and conforms to the shape of the sleeve 267 when disposed therethrough. The retainer 215 shown is configured to form a substantially U-shaped bend 275 in the portion 240 of the flexible pipe 205 disposed therethrough. It can be seen that the sleeve 267 can also be used to define the extent and geometry of the portion 240 of the flexible pipe 205 disposed therethrough as well as the U-shaped bend 275 formed therein.

Figure 3:
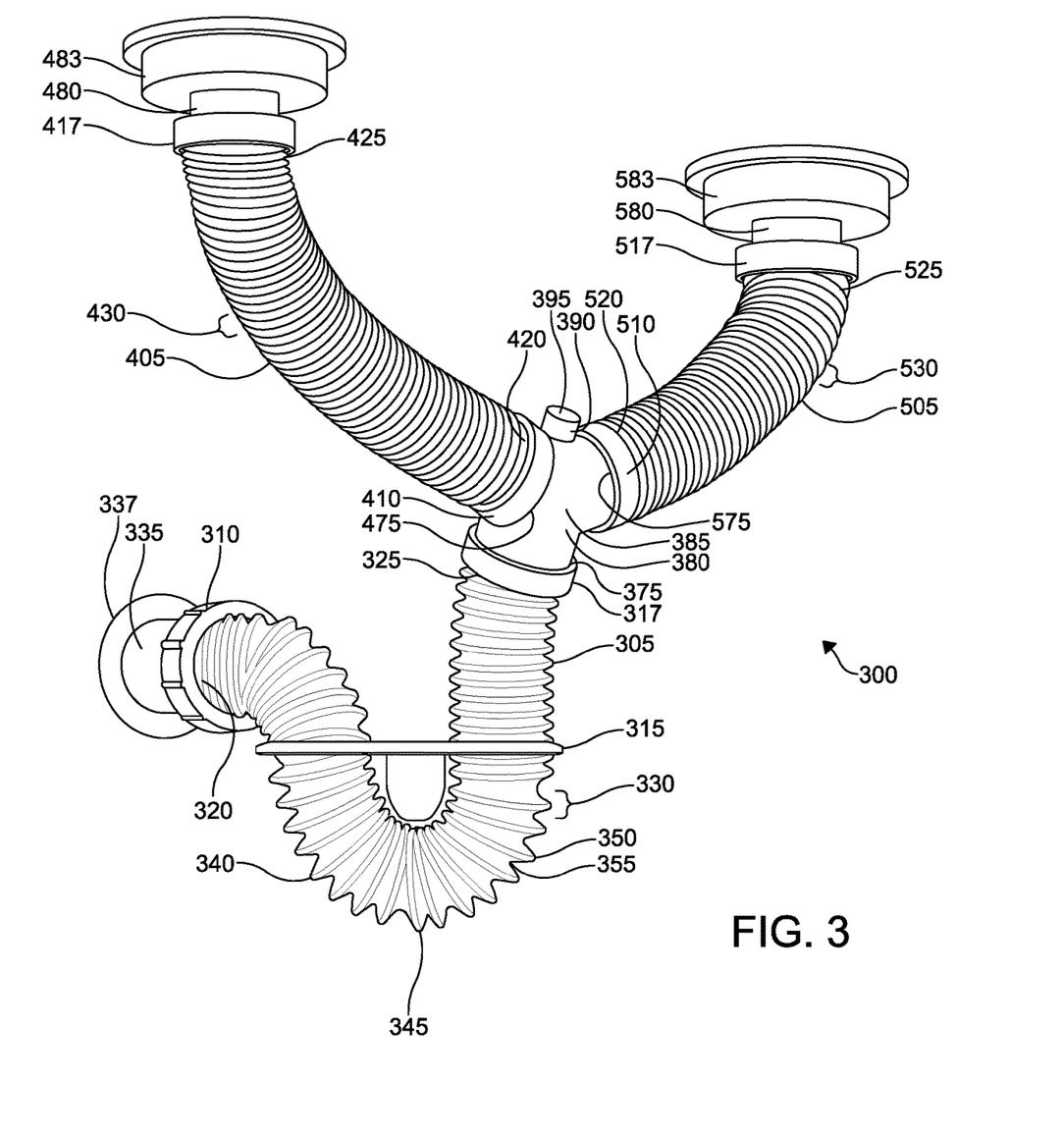
FIG. 3 is a schematic view of an embodiment of a drain pipe assembly installed on a double bowl sink basin.

Turning to FIG. 3, an embodiment of a drain pipe assembly is shown at 300 that includes a first flexible pipe 305, a first female threaded connector 310, a retainer 315, and a second female threaded connector 317. The first flexible pipe 305 includes a first end 320, a second end 325, and a plurality of convolutions formed therein, where a single convolution is denoted by 330. The first female threaded connector 310 is configured to receive one of the convolutions 330 of the first flexible pipe 305 therein. In this way, the first female threaded connector 310 is configured to form a seal when the one of the convolutions 330 received therein is proximate the first end 320 of the first flexible pipe 305 and the first female threaded connector 310 is threadably coupled to a first male threaded coupling 335. In the embodiment shown, the first male coupling 335 is part of a drain line 337. The retainer 315 is configured to dispose a portion 340 of the flexible pipe 305 therethrough to form and retain a trap 345 in the first flexible pipe 305. As can be seen, the plurality of convolutions 330 is formed by alternating ribs and valleys, where a single instance of a rib is identified at 350 and a single instance of a valley is identified at 355. The a second female threaded connector 317 is configured to receive another one of the convolutions 330 therein. In this way, the second female threaded connector 317 is configured to form a seal when the another one of the convolutions 330 received therein is proximate the second end 325 of the first flexible pipe 305 and the second female threaded connector 317 is threadably coupled to a second male threaded coupling 375. In the embodiment depicted, the second male threaded coupling 375 is part of a multi junction connector 380, in this instance a three-way connector 385. The retainer 315 used in the drain pipe assembly 300 is a loop, where although not shown in FIG. 3, the retainer 315 could include a trap distance guide 170, as shown for the embodiment in FIG. 1, that would define a predetermined length of the portion 340 of the flexible pipe 305 to be disposed through the retainer 315 to form and retain the trap 345 in the flexible pipe 305.

The multi junction connector 380, which in the embodiment of FIG. 3 is a three-way connector 385, can be substantially Y-shaped. As shown, the second male threaded coupling 375 can be located on the downward junction of the three-way connector 385, substantially opposite the two other upwardly angled junctions. The three-way connector 385 can include an aperture 390 having a plug 395, where the aperture 390 can be configured to receive a dishwasher drain line when the plug 395 is removed. The plug 395 can be a knock-out plug, for example.

The embodiment of the drain pipe assembly 300 can further include a second flexible pipe 405, a third female threaded connector 410, and a fourth female threaded connector 417. The second flexible pipe 405 has a first end 420, a second end 425, and a plurality of convolutions formed therein, where a single convolution is denoted by 430. The third female threaded connector 410 is configured to receive one of the convolutions 430 of the second flexible pipe 405 therein, where the third female threaded connector 410 is configured to form a seal when the one of the convolutions 430 of the second flexible pipe 405 received therein is proximate the first end 420 of the second flexible pipe 405 and the third female threaded connector 410 is threadably coupled to a third male threaded coupling 475 of the three-way connector 385. The fourth female threaded connector 417 is configured to receive another one of the convolutions 430 of the second flexible pipe 405 therein, where the fourth female threaded connector 417 is configured to form a seal when the another one of the convolutions 430 of the second flexible pipe 405 received therein is proximate the second end 425 of the second flexible pipe 405 and the fourth female threaded connector 417 is threadably coupled to a fourth male threaded coupling 480. As shown in FIG. 3, the fourth male threaded coupling 480 can be part of a sink basin 483.

The embodiment of the drain pipe assembly 300 can further include a third flexible pipe 505, a fifth female threaded connector 510, and a sixth female threaded connector 517. The third flexible pipe 505 has a first end 520, a second end 525, and a plurality of convolutions formed therein, where a single convolution is denoted by 530. The fifth female threaded connector 510 is configured to receive one of the convolutions 530 of the third flexible pipe 505 therein, where the fifth female threaded connector 510 is configured to form a seal when the one of the convolutions 530 of the third flexible pipe 505 received therein is proximate the first end 520 of the third flexible pipe 505 and the fifth female threaded connector 510 is threadably coupled to a fifth male threaded coupling 575 of the three-way connector 385. The sixth female threaded connector 517 is configured to receive another one of the convolutions 530 of the third flexible pipe 505 therein, where the sixth female threaded connector 517 is configured to form a seal when the another one of the convolutions 530 of the third flexible pipe 505 received therein is proximate the second end 525 of the third flexible pipe 505 and the sixth female threaded connector 517 is threadably coupled to a sixth male threaded coupling 580. As shown in FIG. 3, the fourth male threaded coupling 580 can be part of a sink basin 583.

Alternate embodiments of the drain pipe assembly shown at 300 can include the following modifications. Instead of the multi junction connector 380 being separate from the second flexible pipe 405 and the third flexible pipe 505, these components can be integrated into a single piece or pre-assembled into a fixed single component. For example, the multi junction connector 380 can be directly coupled or formed integrally with the first end 420 of the second flexible pipe and the first end 520 of the third flexible pipe 505, where the third female threaded connector 410 and the third male threaded coupling 475 as well as the fifth female threaded connector 510 and the fifth male threaded coupling 575 are not present or necessary. Likewise, the multi junction connector 380 can be formed without the second male threaded coupling 375, where instead this portion of the multi junction connector 380 can be received within the second end 325 of the first flexible pipe 305, and where the second end 325 of the first flexible pipe 305 is coupled thereto using a clamp. For example, the portion of the multi junction connector 380 formerly having the second male threaded coupling 375 can be configured as per pipe 165, 265, shown in FIGS. 1-2. The connection in place of the second male threaded coupling 375 and the second female threaded connector 317 can therefore be configured similar to the manner shown in FIGS. 1-2, where clamp 260 is configured to fit around the second end 225 of the first flexible pipe 205, and the clamp 160, 260 is operable to compress and couple the second end 125, 225 of the first flexible pipe 105, 205 to the pipe 165, 265 received therein. Embodiments of the integrated multi junction connector 380, second flexible pipe 405, and the third flexible pipe 505 component can include the aperture 390 having the plug 395, where the aperture 390 can be configured to receive the dishwasher drain line when the plug 395 is removed. Embodiments of the integrated multi junction connector 380, second flexible pipe 405, and the third flexible pipe 505 component can also be T-shaped, where the multi junction connector 380 forms the top substantially straight portion of the T-shape with the first end 420 of the second flexible pipe and the first end 520 of the third flexible pipe 505. The downward portion of the T-shape includes where the second end 325 of the first flexible pipe 305 receives the integrated multi junction connector 380 and is coupled with a clamp.

Figure 4:
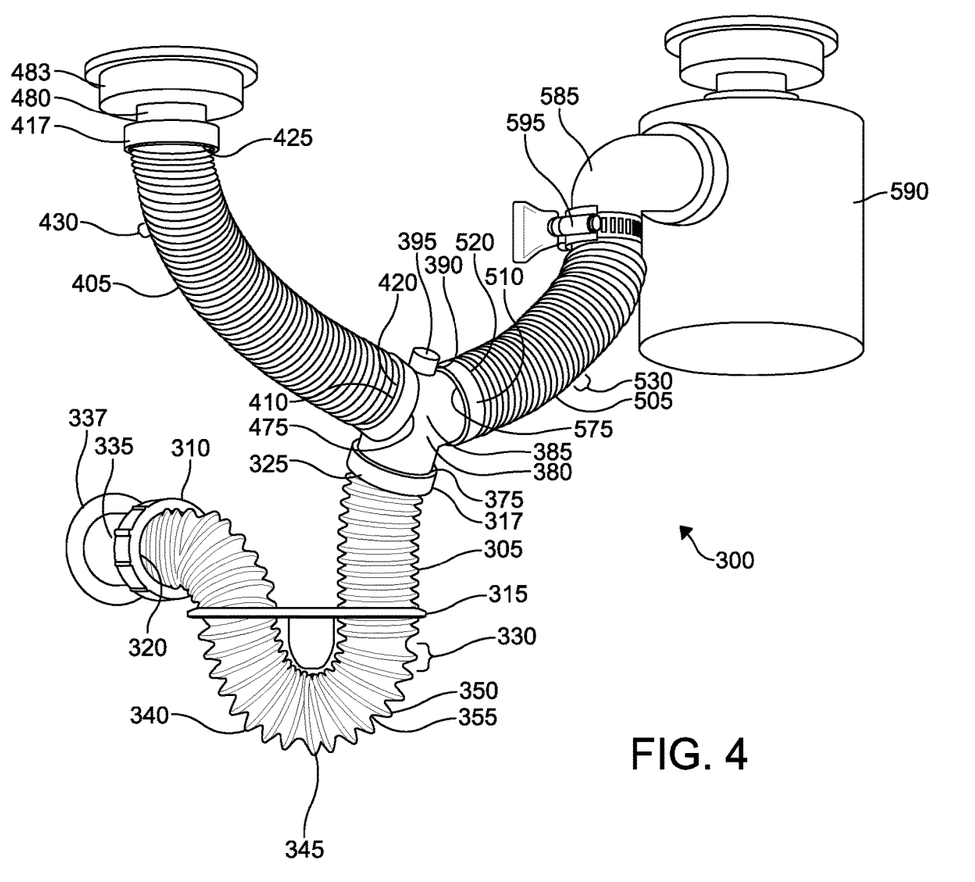
FIG. 4 is a schematic view of an embodiment of a drain pipe assembly installed on a double bowl sink basin where one of the bowls includes a garbage disposal.
Figure 5:
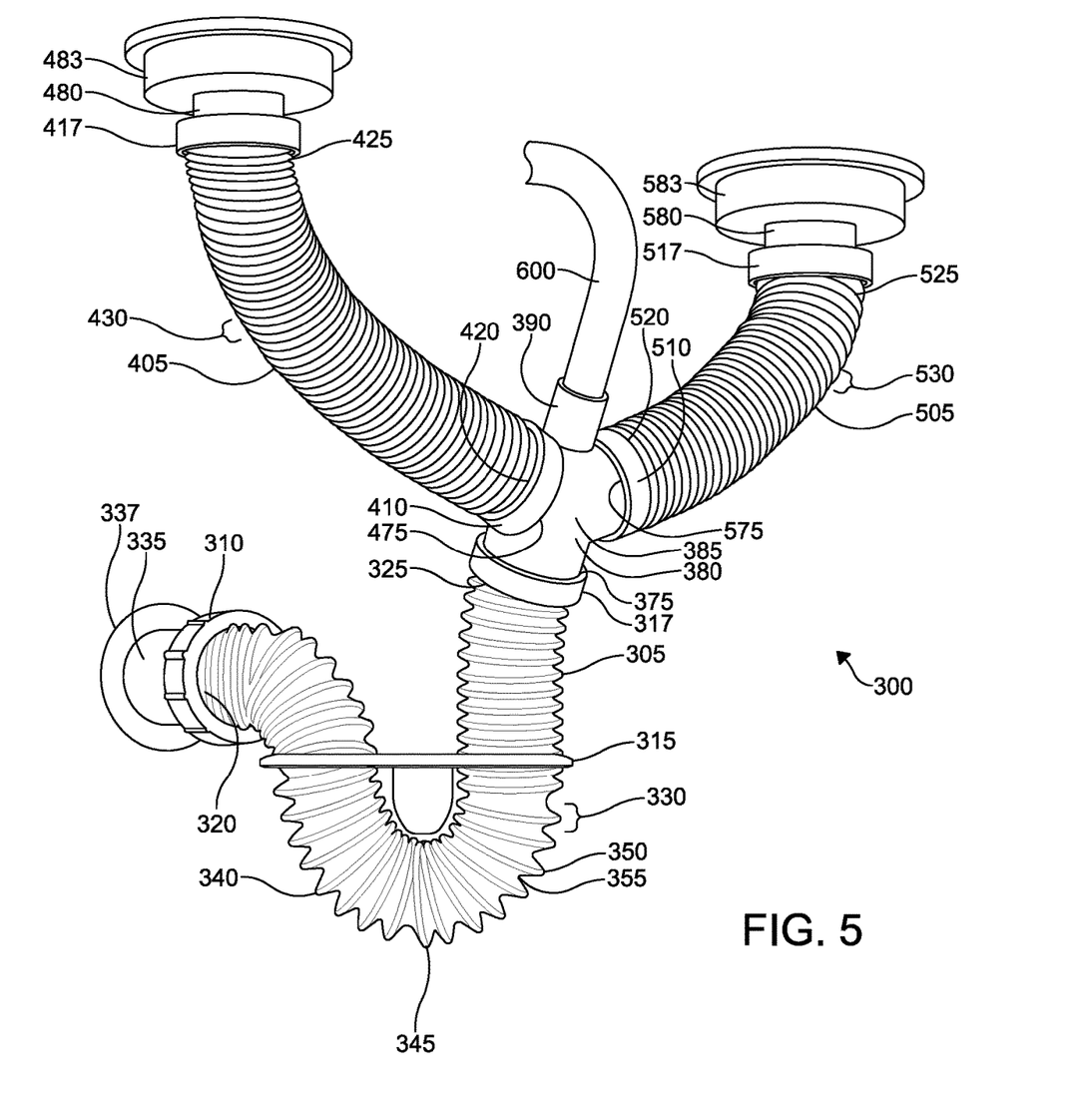
FIG. 5 is a schematic view of an embodiment of a drain pipe assembly installed on a double bowl sink basin where a three-way connector includes an aperture to accept a dishwasher drain line.
Figure 6:
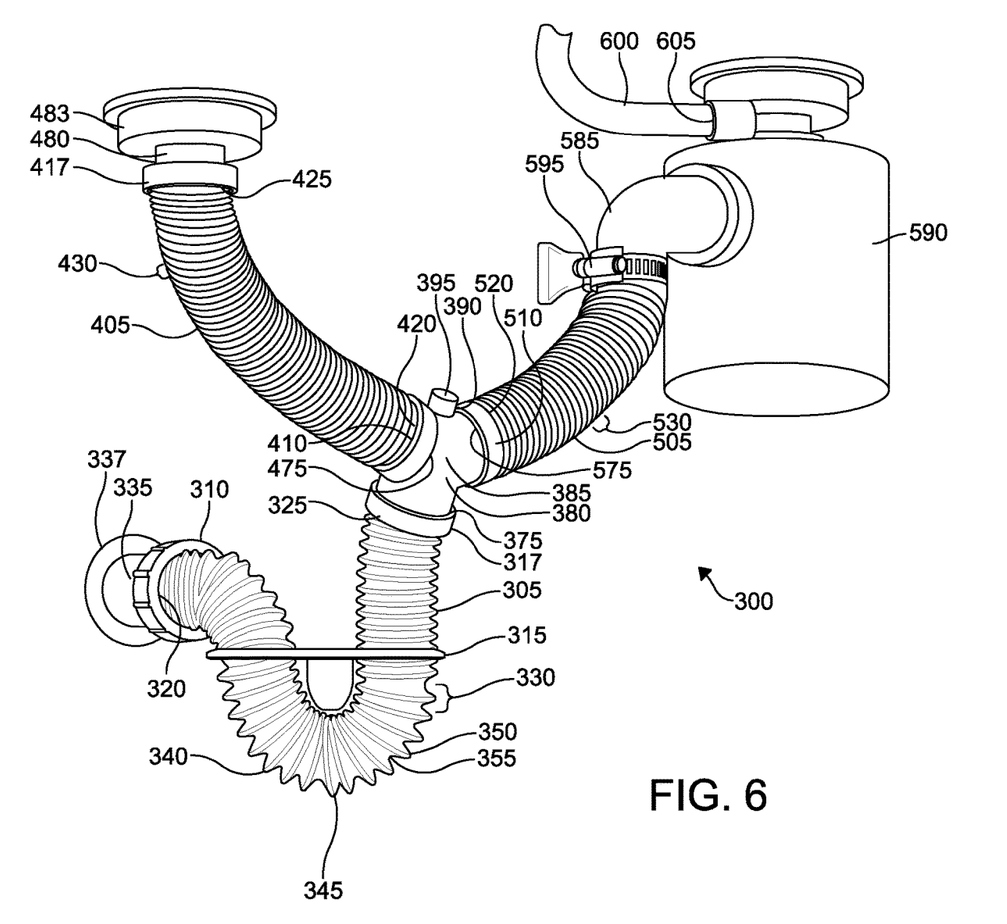
FIG. 6 is a schematic view of an embodiment of a drain pipe assembly installed on a double bowl sink basin where one of the bowls includes a garbage disposal and the garbage disposal accepts a dishwasher drain line.

Turning to FIGS. 4-6, various installed configurations of the drain pipe assembly 300 of FIG. 3 are shown. With particular reference to FIG. 4, the first female threaded connector 310 is configured to be threadably coupled to the first male threaded coupling 335 of a drain line 337, the fourth female threaded connector 417 is configured to be threadably coupled to the fourth male threaded coupling 480 of a sink basin 483, and the second end 525 of the third flexible pipe 505 is coupled to an outlet 585 of a garbage disposal unit 590. The second end 525 of the third flexible pipe 505 can be fit over the outlet 585, where a clamp 595 fit around the second end 525 can be used to compress and couple the second end 525 about the outlet 585 of the garbage disposal unit 590. The clamp can operate in a fashion similar to the clamp 160 shown in FIG. 1. Although not shown, it should be appreciated that the sixth female threaded connector can be configured to be threadably coupled to where a sixth male threaded coupling 580 is located on the outlet 585 of the garbage disposal unit 590. With particular reference to FIG. 5, the drain pipe assembly 300 has a dishwasher drain line 600 coupled to the aperture 390 of the three-way connector 385. For example, the plug 395 of the three-way connector 385 can be a knock-out plug that is removed to expose the aperture 390 for installation of the dishwasher drain line 600. With particular reference to FIG. 6, the second end 525 of the third flexible pipe 505 is coupled to an outlet 585 of a garbage disposal unit 590, as described with respect to FIG. 4, and the dishwasher drain line 600 is coupled to a dishwasher drain inlet 605 of the garbage disposal unit 590.

Figure 7:
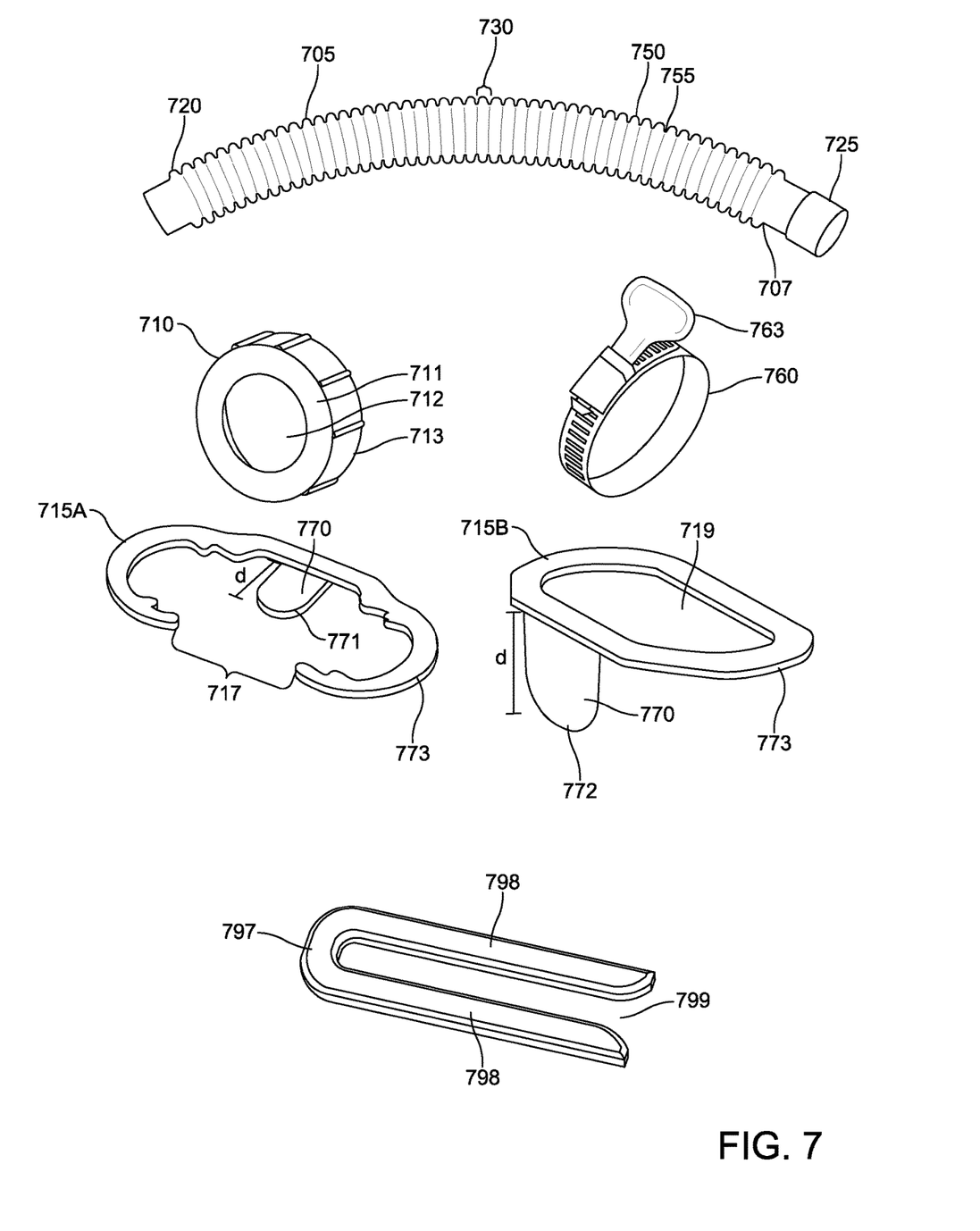
FIG. 7 is a schematic view of various separated components that can be used in embodiments of a drain pipe assembly.

Turning to FIG. 7, embodiments of various components that can be used in drain pipe assemblies are shown. A flexible pipe 705 is shown that has a first end 720, a second end 725, and a plurality of convolutions formed therein, where a single convolution is denoted by 730. The plurality of convolutions 730 is formed by alternating ribs and valleys, where a single instance of a rib is identified at 750 and a single instance of a valley is identified at 755. The second end 725 shown is configured for receiving a tailpipe or other outlet therein where a clamp can then be used to compress the second end 725 of flexible pipe 705 thereabout. However, the second end 725 of the flexible pipe 705 can be cut back to the start of the first convolution, denoted by 707, proximate to the second end 725. It is also possible to cut back the second end 725 of flexible pipe 705 to any of the convolutions 730 therein to adjust the length of the flexible pipe 705 as necessary. The flexible pipe 705 can be used as any of the first, second, third flexible pipes 305, 405, 505 shown in FIGS. 3-6. It should be noted that the flexible pipe 705, as well as the first, second, third flexible pipes 305, 405, 505, can be provided in various geometries, including various diameters and lengths to accommodate various plumbing systems.

A female threaded connector 710 is shown that is configured to receive one of the convolutions 130 of the flexible pipe 705 therein. In this way, the female threaded connector 710 is configured to form a seal when the one of the convolutions 730 received therein is proximate the first end 720 or the second end 725 of the flexible pipe 705 and the female threaded connector 710 is threadably coupled to a first male threaded coupling. For example, the female threaded connector can include a flange 711 extending laterally from an aperture 712, where the aperture is sized substantially similarly to a cross-sectional diameter of the flexible pipe 705 at the location of a valley 755. In this way, a rib 750 of a convolution 730 is pressed between the flange 711 and a male threaded connector received by female threading located within a collar 713 extending from the flange 711.

A clamp 760 is shown that is configured to fit around the second end 725 of the flexible pipe 705, where the clamp 760 is operable to compress and couple the second end 725 of the flexible pipe 705 to a pipe, outlet, or other plumbing component received therein. The clamp 760 can be used as shown for the clamp 160 in FIG. 1 and as shown for the clamp 595 in FIGS. 4 and 6. The clamp 760 can include a key 763 or wingnut type tightening mechanism that can be operated by hand without the need for a screwdriver, socket, or other such tool.

Two embodiments of retainers 715A, 715B are shown, where retainer 715A is configured as a discontinuous loop and retainer 715B is configured as a continuous loop. The retainer 715A is configured as a discontinuous loop includes a break 717 therein, where the break 717 can be sized to permit a cross-sectional diameter of the flexible pipe 705 to fit therethrough. In this way, the break 717 can facilitate disposing a portion of the flexible pipe 705 therethrough to form and retain a trap in the flexible pipe 705. The retainer 715B is configured as a continuous loop with a single aperture 719 therein. A portion of the flexible pipe 705 is disposed through the aperture 719 to form and retain a trap in the flexible pipe 705. Each of retainers 715A, 715B includes a trap distance guide 770 that defines a predetermined length of the portion of the flexible pipe 705 to be disposed through the respective retainer 715A, 715B to form and retain the trap in the flexible pipe 705. The trap distance guide 770 can extend a distance, denoted as distance d in FIG. 7, to define an inside curve distance of the portion of the flexible pipe 705 to be disposed through the retainer 715, in a similar fashion as shown for trap distance guide 170 in FIG. 1. In this way, the distance d of the trap distance guide 770 correlates to the predetermined length of the portion of the flexible pipe 705 to be disposed through the respective retainer 715A, 715B. The trap distance guide 770 can be movable between a parallel position 771 substantially parallel to a remainder of the retainer 715A, 715B, as shown for retainer 715A, to a perpendicular position 772 substantially perpendicular to a remainder of the retainer 715A, 715B, as shown for retainer 715B. The trap distance guide 770 can be moved from the parallel position 771 to the perpendicular position 772 in order to define the predetermined length of the portion of the flexible pipe 705 to be disposed through the retainer 715A, 715B to form and retain the trap in the flexible pipe 705. It can be seen that the trap distance guide 770 can also be used to define the extent and geometry of a U-shaped bend formed in the flexible pipe 705. Each of retainers 715A, 715B can also have a thickness 773 sized to fit between convolutions 730 of the flexible pipe 705. In particular, the respective retainer 715A, 715B can have a thickness 773 sized to nest within a valley 755 between two ribs 750 of the convolutions 730. In this way, the respective retainer 715A, 715B can engage the portion of the flexible pipe 705 disposed therethrough to form and retain the trap in the flexible pipe 705 without movement or slipping of the flexible pipe 705 relative to the retainer 715A, 715B.

A clip 797 is shown that can be configured to pinch the flexible pipe 705 to substantially block passage of fluid therethrough. One or more clips 797 can be used to isolate the trap formed by the drain pipe assembly to minimize spillage during removal or maintenance thereof. Similarly, one or more clips 797 can be used to pinch off the flexible pipe 705 so that a cleaner (e.g., soap, bleach, etc.) can be added to the assembly, allowed to sit for a period of time to clean/sterilize the portion of the flexible pipe 705 forming the trap and/or other portions of the flexible pipe 705 or other flexible pipes. The clip(s) 797 can then be removed to restore flow and wash away the cleaner and any debris. The embodiment of the clip 797 shown has two spaced apart arms 798 with an open end 799 that is pressed into and slid over a valley 755 of the flexible pipe 705 as the flexible pipe 705 becomes pinched between the arms 798.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A drain pipe assembly comprising:
a first flexible pipe including a first end, a second end, and a plurality of convolutions formed therein, wherein each of the plurality of the convolutions formed in the first flexible pipe is formed from an elastomeric material;
a first female threaded connector configured to receive one of the convolutions of the first flexible pipe disposed proximate the first end of the first flexible pipe therein with a flange of the first female connector positioned behind the one of the convolutions wherein a first side of the one of the convolutions received in the first female threaded connector is directly engaged by the flange of the first female threaded connector and a second side of the one of the convolutions received in first female threaded connector is directly engaged by a male threaded coupling when the first female threaded connector is threadably coupled to the male threaded coupling with the one of the convolutions received in the first female threaded connector compressed directly between the flange of the first female threaded connector and the male threaded coupling, and wherein a fluid-tight seal is formed where the male threaded coupling directly engages and compresses the elastomeric material forming the one of the convolutions received in the first female threaded connector along the second side thereof to prevent leakage of a fluid from an interior of the first flexible pipe at a junction of the first flexible pipe and the male threaded coupling.

2. The drain pipe assembly of claim 1, wherein the plurality of convolutions is formed by alternating ribs and valleys, and wherein the flange of the first female connector is received in one of the valleys disposed immediately adjacent the one of the convolutions of the first flexible pipe received within the first female threaded connector.

3. The drain pipe assembly of claim 1, further comprising a clamp configured to fit around the second end of the first flexible pipe.

4. The drain pipe assembly of claim 1, further comprising a retainer configured to dispose a portion of the flexible pipe therethrough to form and retain a trap in the first flexible pipe.

5. The drain pipe assembly of claim 4, wherein the retainer is configured as a continuous loop or a discontinuous loop.

6. The drain pipe assembly of claim 4, wherein the retainer includes a trap distance guide defining a predetermined length of the portion of the flexible pipe to be disposed through the retainer to form and retain the trap in the flexible pipe.

7. The drain pipe assembly of claim 4, wherein the retainer is configured to form a substantially U-shaped bend in the portion of the flexible pipe disposed therethrough.

8. The drain pipe assembly of claim 1, further comprising a three-way connector, wherein the second end of the first flexible pipe is coupled to a first junction of the three-way connector.

9. The drain pipe assembly of claim 8, wherein the three-way connector includes an aperture having a plug, the aperture configured to receive a dishwasher drain line when the plug is removed.

10. The drain pipe assembly of claim 8, further comprising:
a second flexible pipe including a first end, a second end, and a plurality of convolutions formed therein, wherein the first end of the second flexible pipe is coupled to a second junction of the three-way connector.

11. The drain pipe assembly of claim 10, further comprising a second female threaded connector configured to receive one of the convolutions of the second flexible pipe therein, the second female threaded connector configured to form a seal when the one of the convolutions of the second flexible pipe received therein is proximate the second end of the second flexible pipe and the second female threaded connector is threadably coupled to a second male threaded coupling.

12. The drain pipe assembly of claim 11, further comprising:
a third flexible pipe including a first end, a second end, and a plurality of convolutions formed therein, wherein the first end of the third flexible pipe is coupled to a third junction of the three-way connector.

13. The drain pipe assembly of claim 12, further comprising a clamp configured to fit around the second end of the third flexible pipe.

14. The drain pipe assembly of claim 13, wherein:
the first female threaded connector is configured to be threadably coupled to the first male threaded coupling of a waste line;
the second female threaded connector is configured to be threadably coupled to the second male threaded coupling of a sink basin; and
the second end of the third flexible pipe is configured to be coupled to an outlet of a garbage disposal unit, wherein the clamp is operable to compress and couple the second end of the third flexible pipe about the outlet when the outlet is received in the second end of the third flexible pipe.

15. A drain pipe assembly comprising:
a plurality of flexible pipes, each of the flexible pipes including a plurality of convolutions, each of the plurality of the convolutions of each of the plurality of the flexible pipes formed from an elastomeric material;
a plurality of female threaded connectors, each of the plurality of the female threaded connectors configured to be threadably coupled to a male threaded coupling, each of the female threaded connectors configured to receive one of the convolutions of one of the flexible pipes therein with a flange of the corresponding female connector positioned behind the corresponding one of the convolutions received therein, wherein each of the convolutions received in one of the female threaded connectors includes a first side directly engaged by the flange of the corresponding female threaded connector and a second side directly engaged by the corresponding male threaded coupling that is threadably coupled to the corresponding female threaded connector with each of the convolutions received in one of the female threaded connectors compressed directly between the corresponding female threaded connector and the corresponding male threaded connector, wherein a fluid-tight seal is formed where the second side of each of the convolutions received in one of the female threaded connectors directly engages the corresponding male threaded coupling to prevent leakage of fluid from an interior of the corresponding flexible pipe at a junction of the corresponding flexible pipe and the corresponding male threaded coupling;

a multi junction connector including a plurality of junctions, each of the junctions coupled to one of the flexible pipes;

a retainer configured to dispose a portion of one of the flexible pipes therethrough to form and retain a trap in the one of the flexible pipes.

16. A method of installing a drain pipe assembly, the method comprising:
providing a drain pipe assembly according to claim 1;
disposing one of the convolutions proximate the first end of the first flexible pipe within the first female threaded connector to position the flange of the first female connector positioned behind the one of the convolutions received therein; and
coupling the first female threaded connector to the first male threaded coupling to form the fluid-tight seal by directly engaging the one of the convolutions received in the first female connector with the flange of the first female connector and the male threaded coupling and directly compressing the one of the convolutions received in the first female connector between the flange of the first female connector and the male threaded coupling.

17. The drain pipe assembly of claim 12, wherein:
the first female threaded connector is configured to be threadably coupled to the first male threaded coupling of a waste line;
the second female threaded connector is configured to be threadably coupled to the second male threaded coupling of a sink basin.

18. The drain pipe assembly of claim 1, wherein the first end of the first flexible pipe is formed by cutting the first flexible pipe at a predetermined location for establishing a desired distance between the first end and the second end of the first flexible pipe, wherein the first end is formed by cutting the elastomeric material forming each of the convolutions of the first flexible pipe and the predetermined location is disposed between adjacent convolutions formed in the first flexible pipe.

19. The method of claim 16, further comprising a step of cutting the first flexible pipe at a desired location for forming the first end thereof at a desired distance from the second end thereof, wherein the first end is formed by cutting the elastomeric material forming each of the convolutions of the first flexible pipe and the predetermined location is disposed between adjacent convolutions formed in the first flexible pipe.

20. The drain pipe assembly of claim 2, wherein an inner surface of the flange of the first female threaded connector defines an aperture through the first female threaded connector, wherein the first female threaded connector is configured to receive the one of the convolutions of the first flexible pipe therethrough by inwardly flexing the one of the convolutions of the first flexible pipe to pass the rib thereof through the aperture of the first female threaded connector, wherein an outer diameter of the rib of the one of the convolutions of the first flexible pipe is greater than an inner diameter of the aperture of the first female threaded connector when the flange of the first female connector is positioned behind the one of the convolutions received therein.

* * * * *

UNITED STATES PATENT AND TRADEMARK OFFICE
CERTIFICATE OF CORRECTION

| | |
|---|---|
| PATENT NO. | : 11,761,564 B2 |
| APPLICATION NO. | : 16/600678 |
| DATED | : September 19, 2023 |
| INVENTOR(S) | : J. Todd Grayson |

It is certified that error appears in the above-identified patent and that said Letters Patent is hereby corrected as shown below:

On the Title Page

(60) Related U.S. Application Data, the following information should be inserted:
--Provisional Application No. 62/860,848, filed on June 13, 2019.--

Signed and Sealed this
Seventh Day of November, 2023

Katherine Kelly Vidal
*Director of the United States Patent and Trademark Office*